(12) United States Patent
Hatada

(10) Patent No.: US 7,715,117 B2
(45) Date of Patent: May 11, 2010

(54) OPTICAL SYSTEM AND IMAGE PICKUP APPARATUS USING THE SAME

(75) Inventor: Takahiro Hatada, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 53 days.

(21) Appl. No.: 12/206,418

(22) Filed: Sep. 8, 2008

(65) Prior Publication Data

US 2009/0109551 A1    Apr. 30, 2009

(30) Foreign Application Priority Data

Oct. 30, 2007    (JP)    ............................ 2007-281530

(51) Int. Cl.
*G02B 13/04*    (2006.01)
(52) U.S. Cl. ...................... 359/749; 359/750
(58) Field of Classification Search ................ 359/749, 359/750, 751, 752, 753
See application file for complete search history.

(56) References Cited

U.S. PATENT DOCUMENTS 4,957,355 A * 9/1990 Sato ........................... 359/708
7,239,456 B2 * 7/2007 Kimura et al. ............... 359/749
2009/0323205 A1 * 12/2009 Park ........................... 359/753

FOREIGN PATENT DOCUMENTS

JP    06-082689 A    3/1994
JP    2002-287031 A    10/2002

* cited by examiner

*Primary Examiner*—David N Spector
(74) *Attorney, Agent, or Firm*—Canon U.S.A., Inc. I.P. Division

(57) ABSTRACT

An optical system includes a first lens unit having a negative refractive power and a second lens unit having a positive refractive power. The second lens unit includes a front lens unit, a stop, and a rear lens unit. The front lens unit includes a biconvex positive lens located closest to the image side. A back focus during focusing on an infinitely-distant object point (BF), a focal length of the entire optical system (f), a focal length of the positive lens of the front lens unit located closest to the image side (fp), a focal length of the front lens unit (f2a), a refractive power of a surface of the rear lens unit located closest to the object side ($\phi f$), and a refractive power of the entire optical system ($\phi$) satisfy the following conditions:

$1.0 < BF/f < 3.0$ $0.1 < fp/f2a < 0.5$ $0.7 < |\phi f/\phi| < 1.5$.

5 Claims, 4 Drawing Sheets

OPTICAL SYSTEM AND IMAGE PICKUP APPARATUS USING THE SAME

BACKGROUND OF THE INVENTION

1. Field of the Invention

The present invention relates to an optical system. More specifically, the present invention relates to a photographic optical system (shooting optical system) of an image pickup apparatus, such as a silver-halide film camera, a digital still camera, a video camera, or a digital video camera.

2. Description of the Related Art

It is desired by the market that a photographic optical system used for a single-lens reflex digital camera or a single-lens reflex film camera has a wide angle of view and a long back focus. In this regard, as a photographic optical system having a wide angle of view and a long back focus, Japanese Patent Application Laid-Open No. 06-082689 and Japanese Patent Application Laid-Open No. 2002-287031 each discuss a retrofocus type photographic optical system.

A retrofocus type photographic optical system generally has an asymmetrical lens configuration. More specifically, such a retrofocus type photographic optical system includes a lens unit having a negative refractive power in front of an aperture stop (at a position in the photographic optical system closer to an object side) and a lens unit having a positive refractive power behind the aperture stop (at a position in the photographic optical system closer to an image side). The conventional photographic optical system discussed in each of Japanese Patent Application Laid-Open No. 06-082689 and Japanese Patent Application Laid-Open No. 2002-287031 implements a photographic optical system having a wide angle of view and a long back focus.

In a conventional photographic optical system, if an absolute value of the negative refractive power of the front lens unit becomes large, the amount of various aberrations occurring therein may become large. In particular, in a retrofocus type photographic optical system, the wider the angle of view becomes, the more asymmetrical the arrangement of the refractive powers may become. Therefore, in this case, a large amount of various aberrations, such as coma, astigmatism, and spherical aberration, may arise.

For example, in a conventional retrofocus type photographic optical system whose shooting angle of view is about 84° and whose F number is 1.4, a large amount of spherical aberration may occur in the front lens unit having a negative refractive power and the rear lens unit having a positive refractive power, which is located behind the aperture stop. Accordingly, in such a conventional photographic optical system, it is very difficult to effectively and balancedly correct various aberrations, such as spherical aberration.

In order to solve such a problem, it is useful to locate a lens having a strong positive refractive power in front of the aperture stop at a position distant therefrom. With this configuration, negative spherical aberrations occurring in the front lens unit having a negative refractive power and the rear lens unit having a positive refractive power located behind the aperture stop can be corrected.

However, if a lens having a strong positive refractive power is located distant from the aperture stop, the height of incidence of an off-axis light flux into the positive lens may become high. As a result, spherical aberration can be corrected. However, the amount of various aberrations, such as coma and astigmatism, occurring in the lens unit may be increased. Accordingly, in this case, it is difficult to obtain a high-quality image throughout the image plane.

SUMMARY OF THE INVENTION

According to an aspect of the present invention, an optical system includes, in order from an object side to an image side, a first lens unit having a negative refractive power and a second lens unit having a positive refractive power. The second lens unit includes, in order from the object side to the image side, a front lens unit, a stop, and a rear lens unit. The front lens unit includes a biconvex positive lens located closest to the image side. In the optical system, a back focus during focusing on an infinitely-distant object point (BF), a focal length of the entire optical system (f), a focal length of the positive lens of the front lens unit located closest to the image side (fp), a focal length of the front lens unit (f2a), a refractive power of a surface of the rear lens unit located closest to the object side (φf), and a refractive power of the entire optical system (φ) satisfy the following conditions:

$$1.0 < BF/f < 3.0$$

$$0.1 < fp/f2a < 0.5$$

$$0.7 < |\phi f/\phi| < 1.5.$$

According to an exemplary embodiment of the present invention, the occurrence of various aberrations, such as coma and astigmatism, can be suppressed to a minimum while effectively correcting spherical aberration. Furthermore, according to an exemplary embodiment of the present invention, a retrofocus type optical system having a wide angle of view and a long back focus that can achieve a high-quality image throughout the entire image plane can be implemented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DETAILED DESCRIPTION OF THE EMBODIMENTS

Figure 1:
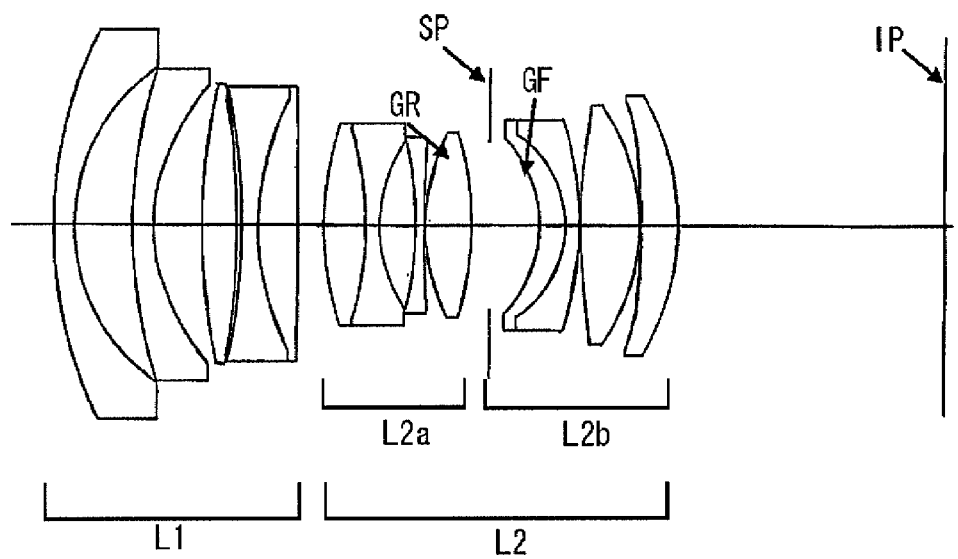
FIG. 1 is a cross section of a lens according to a first exemplary embodiment of the present invention.
Figure 2:
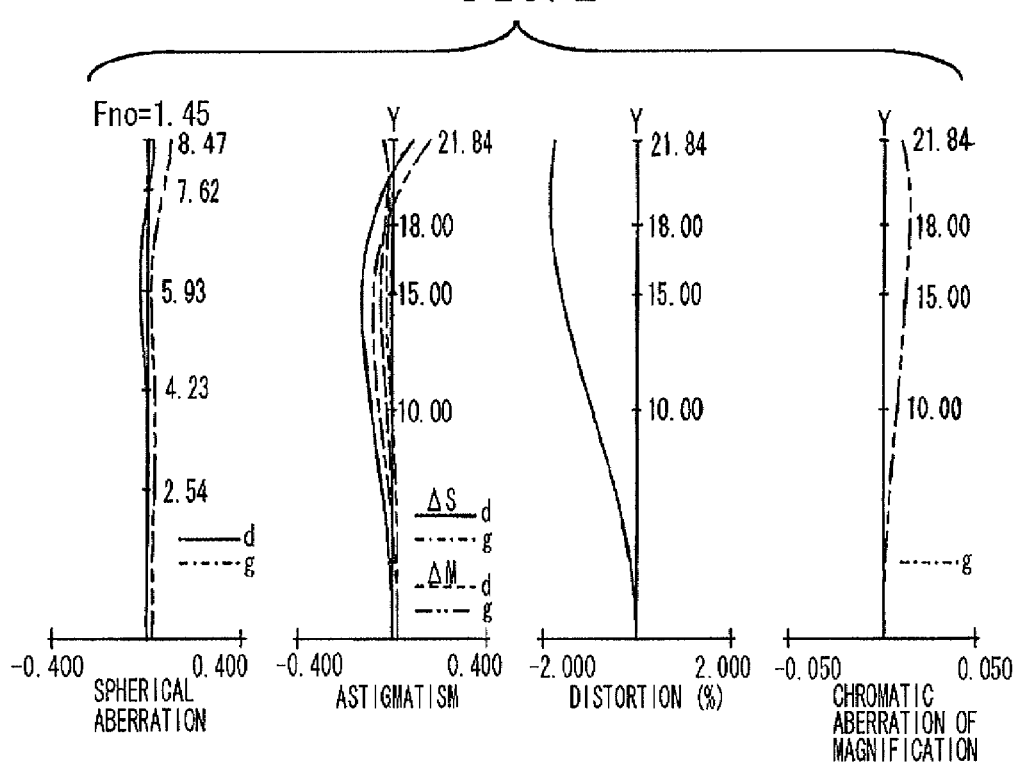
FIG. 2 is an aberration chart during focusing on an infinitely-distant object according to the first exemplary embodiment of the present invention.
Figure 3:
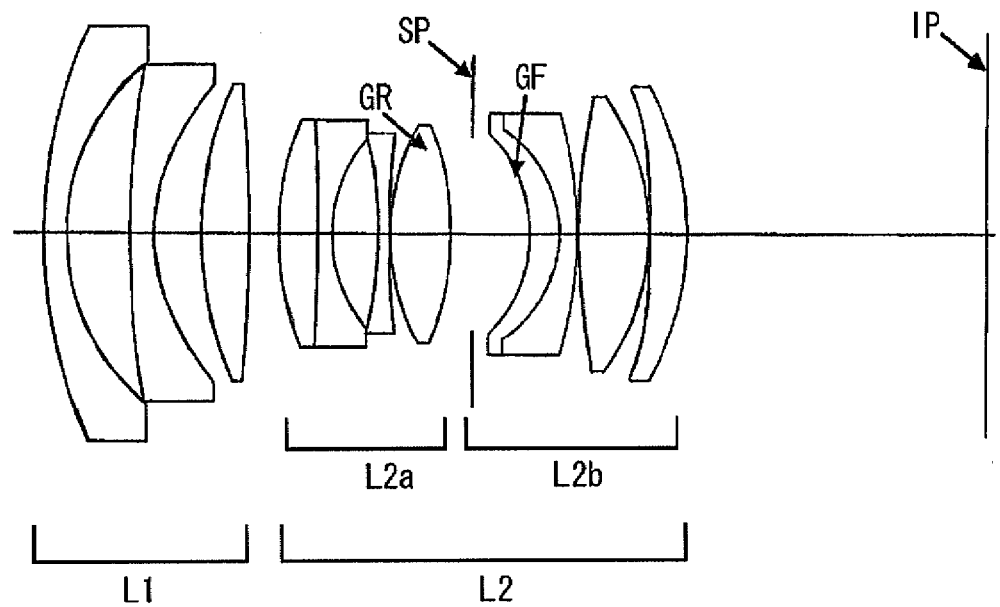
FIG. 3 is a cross section of a lens according to a second exemplary embodiment of the present invention.
Figure 4:
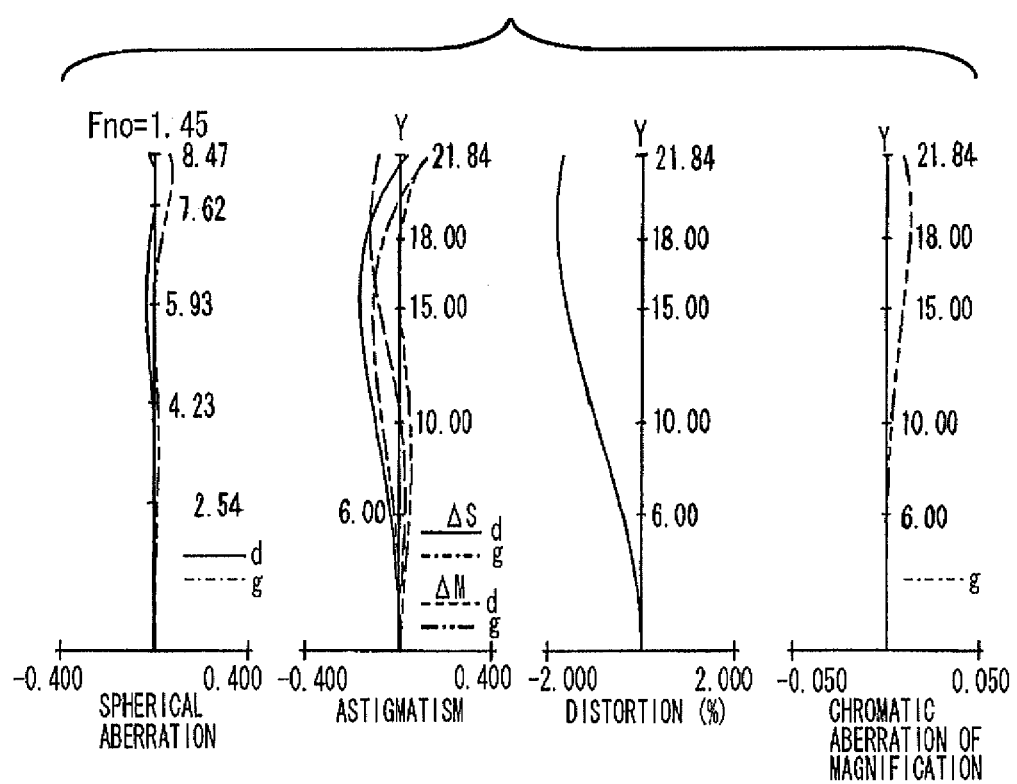
FIG. 4 is an aberration chart during focusing on an infinitely-distant object according to the second exemplary embodiment of the present invention.
Figure 5:
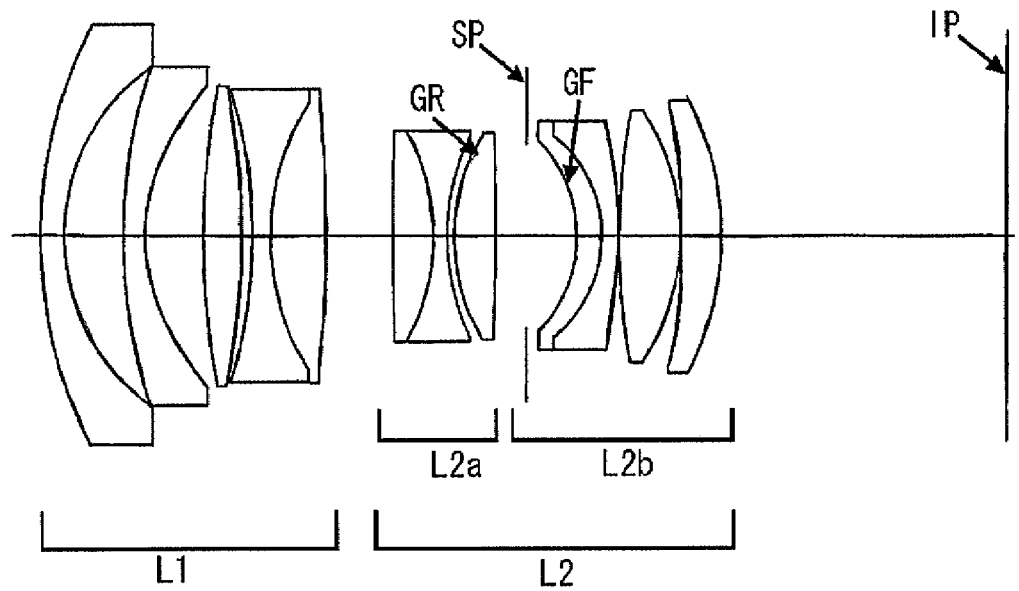
FIG. 5 is a cross section of a lens according to a third exemplary embodiment of the present invention.
Figure 6:
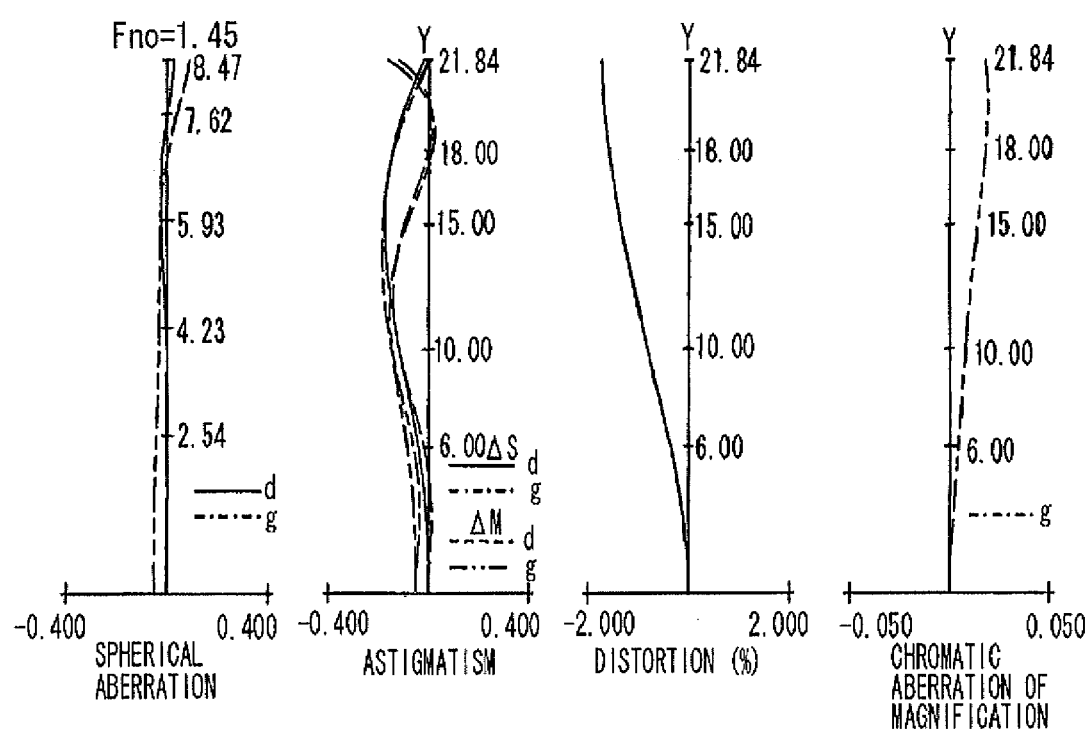
FIG. 6 is an aberration chart during focusing on an infinitely-distant object according to the third exemplary embodiment of the present invention.

Various exemplary embodiments, features, and aspects of the present invention will be described in detail below with reference to the drawings. It is to be noted that the relative arrangement of the components, the numerical expressions, and numerical values set forth in these embodiments are not intended to limit the scope of the present invention.

An optical system according to each of the following exemplary embodiments of the present invention is a retrofocus type optical system. In such a retrofocus type optical system, the focal length of the optical system is shorter than the size (length) of the entire lens (the length from the first lens surface to an image plane). The optical system according to an exemplary embodiment of the present invention includes, in order from the object side to the image side, a first lens unit having a negative refractive power and a second lens unit having a positive refractive power. The second lens unit includes, in order from the object side to the image side, a front lens unit, a stop, and a rear lens unit.

The optical system according to each of the exemplary embodiments of the present invention is a photographic optical system used for an image pickup apparatus, such as a video camera, a digital camera, or a silver-halide film camera. In a cross section of a lens unit according to each of the exemplary embodiments of the present invention, the object side (the front side) is oriented to the left in the drawing, and the image side (the rear side) is oriented to the right.

Note that the optical system according to each of the exemplary embodiments of the present invention can be used as a projection lens for a projector, for example. In this case, a screen is disposed in the left portion of the cross section drawing and a projected image exists in the right portion thereof.

In each cross section of a lens, "L1" denotes a first lens unit having a negative refractive power. "L2" denotes a second lens unit for focusing having a positive refractive power. The second lens unit L2 includes, in order from the object side to the image side, a front lens unit L2a having a positive refractive power, a stop (aperture stop) SP, and a rear lens unit L2b having a positive refractive power. The refractive power refers to an optical power (a reciprocal of the focal length).

"IP" denotes an image plane. In the case of using the optical system as a photographic optical system for a video camera or a digital still camera, a photosensitive surface, which is equivalent to a film surface of a silver-halide film camera, is disposed on an imaging surface of a solid-state image sensor (photoelectric conversion element), such as a charge-coupled device (CCD) sensor or a complementary metal-oxide semiconductor (CMOS) sensor.

"GR" denotes a positive lens of the front lens unit L2a both of whose surfaces have a convex shape (biconvex positive lens) and which is located closest to the image side in the front lens unit L2a. "GF" denotes a surface of the rear lens unit L2b located closest to the object side.

In each of the aberration charts, "d" denotes d-line light and "g" denotes g-line light. "ΔM" denotes a meridional image surface. "ΔS" denotes a sagittal image surface. Chromatic aberration of magnification is expressed with g-line light. "Fno" denotes F-number. "Y" denotes image height.

In the optical system according to each of the exemplary embodiments of the present invention, a back focus during focusing on an infinitely-distant object point (BF), a focal length of the entire optical system (f), a focal length of the positive lens GR of the front lens unit L2a located closest to the image side (fp), a focal length of the front lens unit L2a (f2a), a refractive power of the lens surface GF of the rear lens unit L2b located closest to the object side (φf), and a refractive power of the entire optical system (φ) satisfy the following conditions:

$$1.0 < BF/f < 3.0 \quad (1)$$

$$0.1 < fp/f2a < 0.5 \quad (2)$$

$$0.7 < |\phi f/\phi| < 1.5 \quad (3).$$

Here, the refractive power (φa) can be defined by the following equation:

$$\phi a = (n'-n)/R$$

where "R" denotes a radius of curvature of a lens surface, "n" denotes a refractive index of a medium on a light-incidence side of the lens surface, and "n'" denotes a refractive index of a medium on a light-exiting side of the lens surface.

The condition (1) relates to maintaining an optimum retrofocus ratio (Rf=BF/f) of the optical system.

In a retrofocus type optical system, cause and effect relationships exist among a lens unit having a negative refractive power (the first lens unit) L1, a lens unit having a positive refractive power (the second lens unit) L2, and the back focus BF.

In order to achieve a long back focus, it is required to increase a retrofocus ratio. However, if the retrofocus ratio is increased, the refractive power of the lens unit having a negative refractive power may become extremely large. In this case, the balance between the refractive power of the lens unit having a negative refractive power and the refractive power of the lens unit having a positive refractive power may be lost. More specifically, in this case, Petzval sum may be degraded, which may result in increasing off-axis aberrations, such as curvature of field and distortion. In order to address these problems, each exemplary embodiment of the present invention satisfies the condition (1).

When the upper limit of the condition (1) is exceeded, the power of the first lens unit having a negative refractive power becomes large because the retrofocus ratio becomes large. Accordingly, in this case, it is difficult to set an optimum value for Petzval sum, which may result in increasing the amount of off-axis aberrations. In particular, in this case, it is difficult to correct distortion, astigmatism, and curvature of field.

Furthermore, the front lens diameter may become large. In this case, the size of the entire optical system may become very large.

On the other hand, when the lower limit of the condition (1) is exceeded, the retrofocus ratio may become too small. In this case, in the case of using the optical system in a single-lens reflex camera, it is difficult to ensure an optimally long back focus.

The condition (2) relates to effectively correcting spherical aberration with a small number of lens elements while maintaining a small F-number by appropriately setting the refractive power of the positive lens GR, which is located closest to the stop SP.

If the refractive power of the positive lens GR becomes too small exceeding the upper limit of the condition (2), it becomes difficult to correct positive spherical aberration occurring in the first lens unit having a negative refractive power L1 and the rear lens unit L2b having a positive refractive power, which is located closer to the image side than the stop SP. On the other hand, if the refractive power of the positive lens GR becomes too large exceeding the lower limit, negative spherical aberration may increase, which is not useful.

The condition (3) defines the refractive power of the surface GF of the rear lens unit L2b located closest to the object side. In general, in a fast optical system, a large amount of positive spherical aberration occurs frequently. In this regard, the present embodiment corrects spherical aberration over the entire optical system by increasing the curvature (power) of the concave surface of the rear lens unit L2b located closest to the object side to generate a large amount of negative spherical aberration thereon.

If the upper limit of the conditional expression (3) is exceeded, the curvature on the surface (concave surface) GF of the rear lens unit L2b located closest to the object side becomes too small to correct spherical aberration. On the other hand, if the lower limit is exceeded, the curvature of the surface (concave surface) GF of the rear lens unit L2b located closest to the object side may become too large to correct sagittal coma.

In an exemplary embodiment, it is also useful to set numerical values for the conditions (1) through (3) as follows to achieve a high optical performance over the entire image plane:

$$1.2<BF/f<2.5 \quad (1a)$$

$$0.2<fp/f2a<0.4 \quad (2a)$$

$$0.75<|\phi f/\phi|<1.40 \quad (3a).$$

Each exemplary embodiment of the present invention can implement an optical system that can satisfy each of the above conditions and thus effectively correct various aberrations, such as spherical aberration, coma, or astigmatism, in particular. Furthermore, each exemplary embodiment of the present invention can implement a retrofocus type optical system that can effectively correct various aberrations, such as spherical aberration, coma, or astigmatism, while achieving a wide angle of view by setting the refractive power of the positive lens GR located closest to the stop SP with the values satisfying the condition (2).

In the optical system according to each of the exemplary embodiments of the present invention, it is useful to satisfy at least one of the following conditions. According to the optical system satisfying either of the following conditions, an effect corresponding to each condition can be obtained.

The front lens unit L2a includes a cemented lens composed of a positive lens and a negative lens. Here, it is useful if a refractive index of a material of the positive lens of the cemented lens (Np) and a refractive index of a material of the negative lens of the cemented lens (Nn) satisfy at least one of the following conditions:

$$1.05<Np/Nn<1.50 \quad (4)$$

$$2.0<f2a/f<10.0 \quad (5).$$

The condition (4) relates to a refractive index ratio between the refractive index of the material of the positive lens and that of the negative lens of the cemented lens in the front lens unit L2a. If the lower limit or the upper limit of the condition (4) is exceeded, then it becomes difficult to correct Petzval sum. In this case, off-axis aberration, such as curvature of field, may increase. As a result, the size of the optical system may become large, which is not useful.

The condition (5) relates to the focal length of the front lens unit L2a of the second lens unit L2. If the upper limit of the condition (5) is exceeded, it becomes difficult for the second lens unit L2 to achieve a sufficiently high refractive power. Accordingly, it becomes difficult to correct positive spherical aberration occurring in the first lens unit L1 having a negative refractive power. On the other hand, if the lower limit of the condition (5) is exceeded, negative spherical aberration may increase, which is not useful.

It is further useful to set the range of the numerical values for the conditions (4) and (5) as follows:

$$1.08<Np/Nn<1.40 \quad (4a)$$

$$3.0<f2a/f<8.0 \quad (5a).$$

It is further useful that the first lens unit L1 has the following configuration to balancedly correct off-axis aberration, such as spherical aberration, coma, ore astigmatism.

That is, it is further useful if the first lens unit L1 includes, in order from the object side to the image side, two negative lenses each having a meniscus shape whose convex surface faces the object side, a positive lens both of whose surfaces have a convex shape, and a cemented lens composed of a negative lens both of whose surfaces have a concave shape and a positive lens. Alternatively, it is useful if the first lens unit L1 includes, in order from the object side to the image side, two negative lenses each having a meniscus shape whose convex surface faces the object side and a positive lens both of whose surfaces have a convex shape. In each exemplary embodiment, it is further useful if the front lens unit L2a has the following configuration to balancedly correct the off-axis aberration and spherical aberration.

It is further useful if the front lens unit L2a includes, in order from the object side to the image side, a cemented lens composed of a positive lens both of whose surfaces have a convex shape and a negative lens both of whose surfaces have a concave shape, a negative lens whose concave surface faces the object side, and a positive lens both of whose surfaces have a convex shape. Alternatively, it is further useful if the front lens unit L2a includes, in order from the object side to the image side, a cemented lens composed of a positive lens both of whose surfaces have a convex shape and a negative lens both of whose surfaces have a concave shape, and a positive lens both of whose surfaces have a convex shape.

It is further useful in effectively correcting various aberrations if the rear lens unit L2b has the following configuration. That is, it is further useful in effectively correcting various aberrations if the rear lens unit L2b includes, in order from the object side to the image side, a cemented lens composed of a positive lens having a meniscus shape whose concave surface faces the object side and a negative lens having a meniscus shape whose convex surface faces the image side, a positive lens both of whose surfaces have a convex shape, and a positive lens having a meniscus shape whose convex surface faces the image side.

In each exemplary embodiment, either of the following type can be used for focusing from an infinitely-distant object to a close object:

(a) The first lens unit L1 is stationary (unmovable) and the entire second lens unit L2 is caused to travel (to move)

(b) The first lens unit L1 is stationary and only the rear lens unit L2b of the second lens unit L2 is caused to travel.

(c) The first lens unit L1 is stationary and the front lens unit L2a and the rear lens unit L2b of the second lens unit L2 are caused to come close to each other to be moved.

Considering reducing the load on an actuator and the balance with the optical performance, it is most useful to employ the type (c) in the case of using the optical system as a photographic optical system having an automatic focusing function.

According to each exemplary embodiment having the above-described configuration, a retrofocus type optical system can be achieved that can effectively correct various aberrations, such as spherical aberrations, coma, and astigmatism, and that has a wide angle of view of about 84° and an F-number of 1.45.

Now, an exemplary embodiment using the optical system described above in an image pickup apparatus with respect to the first through third exemplary embodiments will be described in detail below with reference to FIG. 7.

Figure 7:
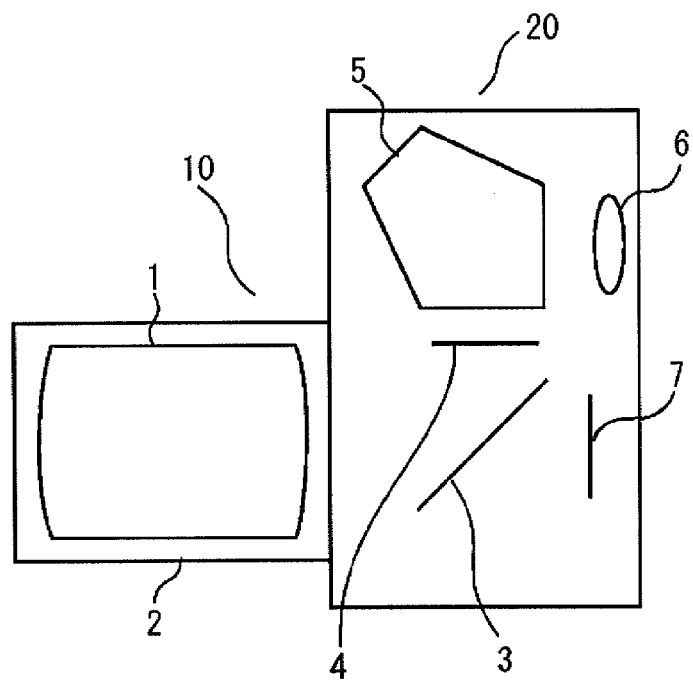
FIG. 7 is a cross section illustrating components of an image pickup apparatus according to an exemplary embodiment of the present invention.

FIG. 7 is a cross section illustrating components of a single-lens reflex camera. Referring to FIG. 7, a photographic optical system 10 includes an optical system 1 according to the first through third exemplary embodiments.

The photographic optical system 1 is held by a lens barrel 2, which is a supporting member. A camera body 20 includes a quick-return mirror 3, a focusing screen 4, a pentagonal roof prism 5, and an eyepiece lens 6.

The quick-return mirror 3 reflects a light flux from the photographic optical system 10. The focusing screen 4 is located at a position where the photographic optical system 10 forms an image. The pentagonal roof prism 5 converts an inverse image formed on the focusing screen 4 into an erect image. An observer can observe the erect image through the eyepiece lens 6.

On a photosensitive surface 7, a solid-state image sensor (photoelectric conversion element) of a CCD sensor or a CMOS sensor or a silver-halide film is located. During shooting, the quick-return mirror 3 retracts from an optical path and the photographic optical system 10 forms an image on the photosensitive surface 7.

Note that the optical system according to the exemplary embodiment of the present invention can be applied to an optical apparatus, such as a telescope, binoculars, a copying machine, or a projector, in addition to a digital camera, a video camera, or a silver-halide film camera.

Numerical examples 1 through 3, which respectively correspond to the first through third exemplary embodiments, are now described.

In each numerical example, "i" denotes an order of a lens surface from the object side. "ri" denotes a radius of curvature of the i-th surface. "di" denotes a distance between the i-th surface and the (i+1)-th surface. "ndi" denotes the refractive index of the i-th member with respect to d-line light. "vdi" denotes an Abbe number of the i-th member with respect to d-line light. "BF" denotes a back focus. "*" indicates that the surface is an aspheric surface. Aspheric data includes aspheric coefficients in the case where the aspheric surface is expressed by the following expression:

$$x = \frac{\frac{h^2}{R}}{1+\sqrt{1-\left(\frac{h}{R}\right)^2}} + c_4 h^2 + c_6 h^2 + c_8 h^2 + c_{10} h^2$$

where "x" denotes an amount of displacement from the reference surface in the direction of the optical axis, "h" denotes a height in the direction perpendicular to the optical axis, "R" denotes the radius of a basic quadric surface, "Cn" denotes an n-th order aspheric coefficient. Furthermore, "E-Z" denotes "$10^{-Z}$".

Table 1 (see page 24) represents a relationship between each condition and various numerical values in each numerical example.

Numerical Example 1

| | | | | |
|---|---|---|---|---|
| L1 | r1 = 61.880 | d1 = 2.994 | nd1 = 1.83481 | vd1 = 42.72 |
| | r2 = 27.026 | d2 = 8.344 | | |
| | r3 = 71.747 | d3 = 3.000 | nd2 = 1.58313 | vd2 = 59.40 |
| | r4* = 25.706 | d4 = 6.931 | | |
| | r5 = 92.706 | d5 = 4.947 | nd3 = 1.88300 | vd3 = 40.76 |
| | r6 = −127.713 | d6 = 0.697 | | |
| | r7 = −97.467 | d7 = 2.500 | nd4 = 1.49700 | vd4 = 81.54 |
| | r8 = 39.023 | d8 = 5.825 | nd5 = 1.83481 | vd5 = 42.72 |
| | r9 = −1070.546 | d9 = 3.788 | | |

-continued

| | | | | |
|---|---|---|---|---|
| L2a | r10 = 46.333 | d10 = 5.979 | nd6 = 1.83481 | vd6 = 42.72 |
| | r11 = −47.248 | d11 = 1.900 | nd7 = 1.54814 | vd7 = 45.79 |
| | r12 = 21.482 | d12 = 5.068 | | |
| | r13 = −53.687 | d13 = 1.400 | nd8 = 1.65412 | vd8 = 39.70 |
| | r14 = 197.561 | d14 = 0.150 | | |
| | r15 = 29.239 | d15 = 6.730 | nd9 = 1.43387 | vd9 = 95.10 |
| | r16 = −44.333 | d16 = 2.594 | | |
| L2b | r17 = stop | d17 = 7.213 | | |
| | r18 = −17.904 | d18 = 3.777 | nd10 = 1.60311 | vd10 = 60.64 |
| | r19 = −15.383 | d19 = 2.150 | nd11 = 1.80518 | vd11 = 25.42 |
| | r20 = −48.206 | d20 = 0.250 | | |
| | r21 = 97.922 | d21 = 8.536 | nd12 = 1.61800 | vd12 = 63.33 |
| | r22 = −29.308 | d22 = 0.250 | | |
| | r23* = −162.434 | d23 = 5.284 | nd13 = 1.80400 | vd13 = 46.57 |
| | r24 = −36.488 | d24 = 38.799 | | |

Aspheric Coefficients

| | | | |
|---|---|---|---|
| r4 | c4 = −5.57660E−06 | c6 = −9.40593E−09 | c8 = 5.84551E−12 |
| | c10 = −3.17028E−14 | | |
| r23 | c4 = −1.09975E−05 | c6 = −1.48146E−09 | c8 = −9.36205E−12 |
| | c10 = −5.31145E−15 | | |

Various Data

| | |
|---|---|
| Focal Length | 24.55 |
| F-number | 1.45 |
| Image Height | 21.64 |
| Lens Total Length | 90.31 |
| BF | 38.80 |

Focal Length of Each Lens Unit

| | |
|---|---|
| L1 | 245.519 |
| L2a | 111.065 |
| L2b | 37.854 |

Numerical Example 2

| | | | | |
|---|---|---|---|---|
| L1 | r1 = 60.645 | d1 = 2.994 | nd1 = 1.83481 | vd1 = 42.72 |
| | r2 = 27.012 | d2 = 8.000 | | |
| | r3 = 117.341 | d3 = 3.000 | nd2 = 1.58313 | vd2 = 59.40 |
| | r4* = 23.272 | d4* = 5.954 | | |
| | r5 = 45.000 | d5 = 5.975 | nd3 = 1.88300 | vd3 = 40.76 |
| | r6 = −181.809 | d6 = 3.691 | | |
| L2a | r7 = 37.305 | d7 = 4.803 | nd4 = 1.83481 | vd4 = 42.72 |
| | r8 = −220.690 | d8 = 1.900 | nd5 = 1.49700 | vd5 = 81.54 |
| | r9 = 18.219 | d9 = 5.662 | | |
| | r10 = −50.884 | d10 = 1.400 | nd6 = 1.65412 | vd6 = 39.70 |
| | r11 = 108.422 | d11 = 0.150 | | |
| | r12 = 27.172 | d12 = 7.637 | nd7 = 1.49700 | vd7 = 81.54 |
| | r13 = −35.855 | d13 = 2.999 | | |
| L2b | r14 = stop | d14 = 7.090 | | |
| | r15 = −17.372 | d15 = 3.725 | nd8 = 1.80400 | vd8 = 46.57 |
| | r16 = −15.383 | d16 = 2.150 | nd9 = 1.80518 | vd9 = 25.42 |
| | r17 = −54.381 | d17 = 0.250 | | |
| | r18 = 77.012 | d18 = 8.895 | nd10 = 1.59240 | vd10 = 68.30 |
| | r19 = −29.139 | d19 = 0.250 | | |
| | r20* = −146.547 | d20 = 4.597 | nd11 = 1.80400 | vd11 = 46.57 |
| | r21 = −37.218 | d21 = 38.012 | | |

Aspheric Coefficients

| | | | |
|---|---|---|---|
| r4 | c4 = −7.07218E−06 | c6 = −1.52849E−08 | c8 = 1.49643E−11 |
| | c10 = −7.71857E−14 | | |
| r20 | c4 = −1.18658E−05 | c6 = −2.84003E−09 | c8 = −1.17097E−11 |
| | c10 = −7.45942E−15 | | |

-continued

Various Data

| | |
|---|---|
| Focal Length | 24.55 |
| F-number | 1.45 |
| Image Height | 21.64 |
| Lens Total Length | 81.12 |
| BF | 38.01 |

Focal Length of Each Lens Unit

| | |
|---|---|
| L1 | 176.108 |
| L2a | 86.220 |
| L2b | 38.447 |

Numerical Example 3

| | | | | |
|---|---|---|---|---|
| L1 | r1 = 59.063 | d1 = 2.994 | nd1 = 1.83481 | vd1 = 42.72 |
| | r2 = 27.010 | d2 = 7.815 | | |
| | r3 = 68.210 | d3 = 3.000 | nd2 = 1.58313 | vd2 = 59.40 |
| | r4* = 24.275 | d4 = 7.599 | | |
| | r5 = 108.731 | d5 = 4.852 | nd3 = 1.88300 | vd3 = 40.76 |
| | r6 = −108.705 | d6 = 1.526 | | |
| | r7 = −66.658 | d7 = 2.500 | nd4 = 1.49700 | vd4 = 81.54 |
| | r8 = 32.662 | d8 = 7.321 | nd5 = 1.83481 | vd5 = 42.72 |
| | r9 = −172.465 | d9 = 8.840 | | |
| L2a | r10 = 547.204 | d10 = 5.324 | nd6 = 1.83481 | vd6 = 42.72 |
| | r11 = −27.839 | d11 = 1.900 | nd7 = 1.65412 | vd7 = 39.70 |
| | r12 = 29.617 | d12 = 0.875 | | |
| | r13 = 25.336 | d13 = 5.618 | nd8 = 1.49700 | vd8 = 81.54 |
| | r14 = −411.804 | d14 = 4.090 | | |
| L2b | r15 = stop | d15 = 6.627 | | |
| | r16 = −17.992 | d16 = 3.205 | nd9 = 1.80400 | vd9 = 46.57 |
| | r17 = −16.912 | d17 = 2.150 | nd10 = 1.80518 | vd10 = 25.42 |
| | r18 = −67.130 | d18 = 0.250 | | |
| | r19 = 86.485 | d19 = 8.071 | nd11 = 1.61800 | vd11 = 63.33 |
| | r20 = −29.407 | d20 = 0.250 | | |
| | r21* = −231.324 | d21 = 5.300 | nd12 = 1.80400 | vd12 = 46.57 |
| | r22 = −37.889 | d22 = 38.009 | | |

Aspheric Coefficients

| | | | |
|---|---|---|---|
| r4 | c4 = −6.72766E−06 | c6 = −1.54205E−08 | c8 = 2.34607E−11 |
| | c10 = −6.75849E−14 | | |
| r21 | c4 = −1.10021E−05 | c6 = −3.10945E−09 | c8 = −6.17052E−12 |
| | c10 = −1.02038E−14 | | |

Various Data

| | |
|---|---|
| Focal Length | 24.55 |
| F-number | 1.45 |
| Image Height | 21.64 |
| Lens Total Length | 90.11 |
| BF | 38.01 |

Focal Length of Each Lens Unit

| | |
|---|---|
| L1 | 911.168 |
| L2a | 143.535 |
| L2b | 38.941 |

TABLE 1

| Condition | Numerical Example | | |
|---|---|---|---|
| | 1 | 2 | 3 |
| (1) | 1.58 | 1.55 | 1.55 |
| (2) | 0.376 | 0.379 | 0.336 |
| (3) | 0.825 | 1.137 | 1.108 |
| (4) | 1.18 | 1.26 | 1.11 |
| (5) | 4.52 | 3.51 | 5.85 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-281530 filed Oct. 30, 2007, which is hereby incorporated by reference herein in its entirety.

What is claimed is:

1. An optical system comprising, in order from an object side to an image side:
   a first lens unit having a negative refractive power; and
   a second lens unit having a positive refractive power,
   wherein the second lens unit includes, in order from the object side to the image side:
      a front lens unit;
      a stop; and
      a rear lens unit,
   wherein the front lens unit includes a biconvex positive lens located closest to the image side, and
   wherein a back focus during focusing on an infinitely-distant object point (BF), a focal length of the entire optical system (f), a focal length of the positive lens of the front lens unit located closest to the image side (fp), a focal length of the front lens unit (f2a), a refractive power of a surface of the rear lens unit located closest to the object side ($\phi f$), and a refractive power of the entire optical system ($\phi$) satisfy the following conditions:

$1.0 < BF/f < 3.0$ $0.1 < fp/f2a < 0.5$ $<0.7 < |\phi f/\phi| < 1.5$.

2. The optical system according to claim 1, wherein the front lens unit includes a cemented lens including a positive lens and a negative lens, and
   wherein a refractive index of a material of the positive lens of the cemented lens (Np) and a refractive index of a material of the negative lens of the cemented lens (Nn) satisfy the following condition:

$1.05 < Np/Nn < 1.50$.

3. The optical system according to claim 1, wherein the focal length of the front lens unit (f2a) and the focal length of the entire optical system (f) satisfy the following condition:

$2.0 < f2a/f < 10.0$.

4. The optical system according to claim 1, wherein the first lens unit is stationary and the second lens unit is moved towards the object side during focusing from an infinitely-distant object to a closest object.

5. An image pickup apparatus comprising the optical system according to claim 1 and a solid-state image sensor configured to receive an image formed by the optical system.

* * * * *